Patented Aug. 25, 1953

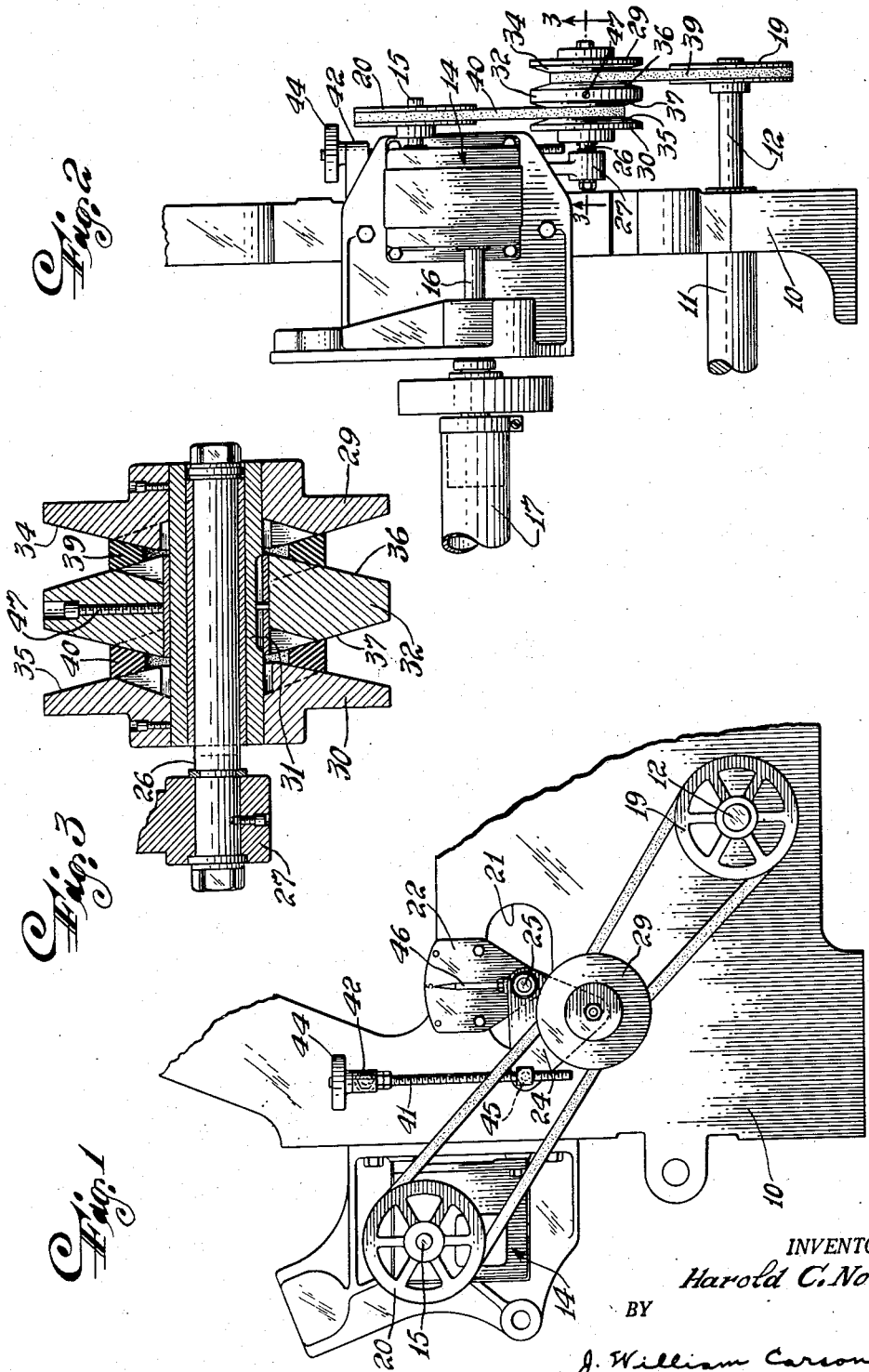

2,649,811

UNITED STATES PATENT OFFICE 2,649,811

VARIABLE-SPEED DRIVE FOR FABRIC TAKE-UP ROLL OF WARP KNITTING MACHINES

Harold C. Noe, Upper Montclair, N. J., assignor to Kidde Manufacturing Co., Inc., Bloomfield, N. J., a corporation of Delaware Application February 2, 1951, Serial No. 209,018

2 Claims. (Cl. 74—230.17)

The present invention relates to warp knitting machines, and, more particularly, relates to an improved variable speed drive for the fabric take-up roll of such machines.

Warp knitting machines of the type with which the present invention is primarily concerned include a fabric take-up roll driven through a speed reducer by a drive shaft, such as the cam shaft, which is operated at a preset constant speed. In utilizing such machines for knitting various types of fabric, it is desirable to vary the speed of the take-up roll to meet the take-up conditions of each type of fabric.

Accordingly, an object of the present invention is to provide a simple, practical and economical variable speed drive for the take-up roll.

Another object is to provide such a drive which is particularly adapted for assembly on a warp knitting machine to drivingly connect the take-up roll speed reducer and the cam shaft.

A further object is to provide such a variable speed drive which is readily adjusted.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a variable speed drive generally comprising a drive pulley on the cam shaft or other drive shaft, a driven pulley on the input shaft of the take-up roll speed reducer, a stud shaft between these pulleys, a support for the stud shaft pivotally mounted to vary the position thereof with respect to these pulleys, a pair of outer connected spaced apart flanges mounted for rotative and longitudinal movement on the stud shaft, the outer flanges having inner opposed annular conical surfaces, a central flange positioned between the outer flanges and mounted for rotation therewith and for lateral movement therebetween to adjust the position thereof with respect to the outer flanges, the central flange having an annular conical surface at each side thereof, each facing a surface of the outer sheaves to provide in effect a pair of V-belt receiving, variable speed pulley assemblies, a V-belt drivingly connecting the drive pulley and one of the pulley assemblies, and a second V-belt drivingly connecting the other pulley assembly and the driven pulley.

As shown in an illustrative embodiment of the invention about to be described, the central flange is provided with means for securing the same against lateral movement in desired positions of adjustment; mechanism is provided for varying the position of the stud shaft support; and the support and structural elements associated therewith are provided with indicia for indicating various positions of adjustment.

A preferred embodiment of the invention has been chosen for purposes of illustration and description, and is shown in the accompanying drawings, forming a part of the specification, wherein:

Figure 1 is a fragmentary end elevational view of a warp knitting machine illustrating only the elements with which the present invention is concerned.

Figure 2 is a fragmentary front elevational view of the elements shown in Figure 1.

Figure 3 is an enlarged sectional view taken along the line 3—3 on Figure 2, illustrating the variable speed pulley assemblies.

Referring to the drawings and more particularly to Figures 1 and 2 thereof, there is shown a portion of a warp knitting machine which includes an end frame 10, a drive shaft 11, such as the cam shaft of the machine journaled for rotation in the end frame and having an outer section 12 extending beyond the end frame, a speed reducer 14 having an input shaft 15 and an output shaft 16 are mounted on the end frame, and a fabric take-up roll 17 driven from the output shaft 16 and having a friction surface around which the fabric passes as it is delivered from the knitting elements of the machine to the take-up reel. The shaft 12 has a pulley 19 mounted thereon for rotation therewith, and the shaft 15 has a pulley 20 mounted thereon for rotation therewith, these pulleys being drivingly connected by the variable speed drive in accordance with the invention as about to be described. Preferably, these pulleys have an annular recess for receiving a V-belt.

Intermediate the shafts 12 and 15, the end frame is formed with a slot 21 above which a plate 22 is secured which has a lower portion overlying the slot. A support 24, such as a triangular plate, has one corner pivotally connected to the plate 22 at 25, and has a stud shaft 26 secured in a boss 27 at another corner thereof.

As shown more clearly in Figures 2 and 3, an assembly providing a pair of V-belt pulleys is mounted for rotative and longitudinal movement on the stud shaft 26. This assembly comprises a pair of spaced apart outer flanges 29 and 30 connected by a sleeve 31, and a central flange 32 keyed or arbored on the sleeve 31 for rotation therewith and arranged for lateral movement thereon between the outer flanges 29 and 30 (Figure 3).

The flanges 29 and 30 respectively have inner opposed annular conical surfaces 34 and 35, and the central flange has an annular conical surface 36 at one side thereof and a similar surface 37 at the other side thereof. The surfaces 34 and 36 cooperate to provide in effect a pulley recess for receiving a V-belt 39 in driving connection with the pulley 19, and the surfaces 35 and 37 cooperate likewise to provide a recess for receiving a V-belt 40 in driving connection with the pulley 20 whereby the shaft 12 effects rotation of the shaft 15 through the foregoing described belt and pulley arrangement.

Assuming that the pulleys 19 and 20 have equal diameters and that the V-belts 39 and 40 engage the sets of pulley surfaces 34 and 36 and 35 and 37, respectively, at zones of equal diameter as shown, the shaft 15 will be driven at the same speed as the shaft 12. With the speed of the shaft 12 being constant, the speed of the shaft 15 can be varied by causing the belts 39 and 40 to engage their respective sets of pulley surfaces at zones of unequal diameters. For example, by shifting the central flange 32 to the right as viewed in Figures 2 and 3, the belt 39 engages a zone of a larger diameter and the belt 40 engages a zone of a smaller diameter whereby the shaft 15 will be driven at a lower speed than the shaft 12. Similarly, the shaft 15 can be caused to be driven at a higher speed than the shaft 12 by shifting the central flange 32 to the left.

In order to facilitate shifting of the central flange 32 to effect a variation in the speed of the shaft 15, the support 24 is rocked about its pivot 25 to move the stud shaft 26 nearer to or further away from either the shaft 12 or the shaft 15. For example, by moving the stud shaft nearer to the shaft 12 and further away from the shaft 15, the belt 39 is slackened and the central flange may be shifted to the right to take up the slack by causing this belt to engage the surfaces 34 and 36 at a zone of larger diameter and the belt 40 is enabled to engage the surfaces 35 and 37 at a zone of smaller diameter. The reverse can be accomplished by moving the stud shaft nearer to the shaft 15 and further away from the shaft 12. The outer flanges realign themselves with the pulleys 19 and 20 by shifting longitudinally on the stud shaft.

As illustrated in Figure 1, such movement of the support can be effected by mechanism comprising a rod or shaft 41 journalled for rotation in a pivotally mounted sleeve 42 and carrying a handwheel 44 for effecting rotation thereof, and a nut 45 pivotally mounted on the third corner of the support plate through which a threaded section of the rod extends.

In order to give a readily visible indication of the speed ratio of the shafts 12 and 15 by reason of the pulley assembly adjustment, the support 24 carries an indicator or pointer 46 adjacent its pivot 25 which cooperates with suitable indicia on the support mounting plate 22.

When the speed of the shaft 15 has been adjusted, it is desired that this adjustment be maintained during subsequent operation of the machine, and, for this purpose, the central flange is provided with a set screw 47 which is tightened after adjustment has been made to secure the central flange 32 on the sleeve 31 against lateral movement. During adjustment, the set screw is loosened to enable the central flange to be shifted.

From the foregoing description, it will be seen that the present invention provides a simple, practical and economical variable speed drive which is readily adjusted in an expeditious manner. The elements of this drive are readily assembled and installed and are capable of withstanding such usage to which they will be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a warp knitting machine including a drive shaft operated at a constant speed, a fabric take-up roll and a speed reducer having an input shaft and having an output shaft in driving connection with the take-up roll: the combination of a drive pulley on the drive shaft, a driven pulley on the input shaft, a stud shaft between said pulleys, a support for said stud shaft, means for pivotally mounting said support to vary the position of said stud shaft with respect to said pulleys, said support having a pointer thereon extending radially outwardly from said means pivotally mounting said support, a pair of outer connected spaced apart flanges mounted for rotative and longitudinal movement on said stud shaft, said outer flanges having inner opposed annular conical surfaces, a central flange positioned between said outer flanges and mounted for rotation therewith and for lateral movement therebetween, said central flange having an annular conical surface at each side thereof each respectively facing a surface of one of said outer flanges to provide in effect a pair of V-belt receiving variable speed pulley assemblies, a V-belt drivingly connecting said drive pulley and one of said pulley assemblies, a second V-belt drivingly connecting said other pulley assembly and said driven pulley, and fixed indicia adjacent the outer end of said pointer for cooperation therewith to indicate the position in which said support is adjusted.

2. In a warp knitting machine including a drive shaft operated at a constant speed, a fabric take-up roll and a speed reducer having an input shaft and having an output shaft in driving connection with the take up roll: the combination of a drive pulley on the drive shaft, a driven pulley on the input shaft, a stud shaft between said pulleys, a support for said stud shaft, means for pivotally mounting said support to vary the position of said stud shaft with respect to said pulleys, a sleeve, means for mounting said sleeve to pivot about a fixed point, a threaded nut pivotally mounted on said support, a rod having one end journalled in said sleeve and extending therethrough and having a threaded section at its other end extending through said nut, means on said first mentioned end of said rod for rotating said rod to effect cooperation between said threaded section and said nut to cause pivotal movement of said support and thereby adjust the position thereof, a pair of outer connected spaced apart flanges mounted for rotative and longitudinal movement on said stud shaft, said outer flanges having inner opposed annular conical surfaces, a central flange positioned between said outer flanges and connected for rotation therewith and for lateral movement therebetween, said central flange having an annular conical surface at each side thereof each respectively facing a surface of one of said outer flanges to provide in effect a pair of V-belt receiving variable speed pulley assemblies, a V-belt drivingly connecting said drive pulley and one of said pulley assemblies, and a second V-belt drivingly connecting said other pulley assembly and said driven pulley.

HAROLD C. NOE.

References Cited in the file of this patent

UNITED STATES PATENTS

| Number | Name | Date |
| --- | --- | --- |
| 1,986,746 | Quick et al. | Jan. 1, 1935 |
| 2,186,477 | Coddington | Jan. 9, 1940 |
| 2,235,122 | Shaw | Mar. 18, 1941 |
| 2,245,889 | Windle | June 17, 1941 |
| 2,253,921 | Van Sant | Aug. 26, 1941 |